US006653807B2

(12) United States Patent
Saito et al.

(10) Patent No.: US 6,653,807 B2
(45) Date of Patent: Nov. 25, 2003

(54) STARTER CONTROL SYSTEM FOR AUTOMOTIVE VEHICLE

(75) Inventors: Mikio Saito, Motosu-gun (JP); Masato Hanai, Atsumi-gun (JP); Masanori Ohmi, Anjo (JP); Masahiko Osada, Okazaki (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/940,646

(22) Filed: Aug. 29, 2001

(65) Prior Publication Data

US 2002/0043947 A1 Apr. 18, 2002

(30) Foreign Application Priority Data

Aug. 30, 2000 (JP) ....................................... 2000-261110
Apr. 27, 2001 (JP) ....................................... 2001-131377

(51) Int. Cl.[7] ............................... H02P 1/04; H02P 1/00
(52) U.S. Cl. ........................ 318/430; 318/431; 318/445
(58) Field of Search ................................. 318/430, 431, 318/445

(56) References Cited

U.S. PATENT DOCUMENTS

| | | | | | |
|---|---|---|---|---|---|
| 5,459,386 | A | * | 10/1995 | Okachi et al. | 318/727 |
| 5,656,981 | A | | 8/1997 | Niimi et al. | |
| 6,104,157 | A | * | 8/2000 | Kramer et al. | 318/445 |
| 6,308,674 | B1 | * | 10/2001 | Ruehle et al. | 123/179.3 |
| 6,369,539 | B1 | * | 4/2002 | Morimoto et al. | 318/151 |
| 6,394,208 | B1 | * | 5/2002 | Hampo et al. | 180/65.2 |
| 6,516,767 | B1 | * | 2/2003 | Maillet et al. | 123/179.3 |

* cited by examiner

*Primary Examiner*—Robert E. Nappi
*Assistant Examiner*—Patrick Miller
(74) *Attorney, Agent, or Firm*—Oliff & Berridge, PLC

(57) ABSTRACT

A starter control system is comprised of a starter motor, a control circuit for controlling the starter motor to rotate at a preliminary rotation speed that is high enough to engage a pinion with an engine for a predetermined time and low enough to suppress a harsh noise caused when the pinion engages the engine and, thereafter, at a normal rotation speed that is high enough to start the engine, and a control circuit for changing the preliminary rotation speed according to an engine temperature. The starter control system is effective to reduce noises that are caused when the engine is started by an economy-run system.

13 Claims, 3 Drawing Sheets

STARTER CONTROL SYSTEM FOR AUTOMOTIVE VEHICLE

CROSS REFERENCE TO RELATED APPLICATION

The present application is based on and claims priority from Japanese Patent Applications: 2000-261110 filed Aug. 30, 2000; and 2001-131377, filed Apr. 27, 2001; the contents of which are incorporated herein by reference.

BACKGROUND OF THE INVENTION

1. Field of the Invention

The present invention relates to a system for controlling an engine-starting starter.

2. Description of the Related Art

Recently, an economy-run system has been employed in an automotive vehicle in order to improve fuel consumption of the vehicle and to reduce engine exhaust gases of vehicle engine. Such an economy-run system stops an engine whenever the vehicle makes a stop. In such a economy-run system, the engine is stopped according to a condition such as vehicle speed, open angle of accelerator, brake condition, etc. As soon as the brake pedal is eased up and the accelerator pedal is depressed, the starter is operated to start the engine, thereby starting the vehicle.

However, if a pinion gear of the starter abruptly engages a ring gear of the engine while the starter is rotating an engine at a normal speed, the starter may not start up the engine quickly due to a shock caused by the engagement. Such a conventional economy-run system takes a considerable time to fully start up the engine after making a stop. According to a report of the National Police Agency, traffic jam may be expected in a city where many vehicles are running if such a starting time becomes longer than a certain time. Therefore, it is necessary to shorten the engine starting time.

In such an economy-run system, the engine is stopped and started so frequently that the starting noise becomes harsh to an ordinary user of a vehicle. However, it is not sufficient to suppress such the starting noise by a noise absorption material or noise insulating material. A large amount of such materials may increase the vehicle weight and fuel consumption rate of the vehicle. Therefore, it is also necessary to decrease the starting noise.

SUMMARY OF THE INVENTION

The present invention has been made in view of the above-stated problem and has an object of providing a starter control system that can shorten the engine starting time and reduce the starting noises caused while the engine is being started.

According to a main feature of the invention, when an engine is driven or rotated by a starter, a starter motor rotates at a preliminary speed that is lower than a normal rotation speed.

If the engine is rotated at a suitable rotation speed that is lower than the normal speed for a predetermined period before it is rotated at a normal operation speed, the engine can fully start up more quickly. When the key switch is turned on, the starter rotates at the preliminary speed and the pinion of the starter engages the ring gear of the engine at a suitable low speed. Therefore, the rattling gear noise caused during the engagement is small. Because the engine is preliminary rotated at a suitable low speed for a predetermined period, noise caused during tottering cranking operation of the engine due to a large inertia thereof or fluctuation of pistons reciprocating between a bottom dead point and the top dead point of the engine can be reduced. Thus, the harsh noise during the engine cranking can be reduced. As a result, the engine starting time can be shorten and the noises can be reduced.

According to another feature of the invention, the preliminary rotation speed is changeable according to an engine condition.

According to another feature of the invention, the preliminary rotation period is changeable according to an engine condition.

According to another feature of the invention, the rotation speed is changed by a variable resistor or an electronic conduction element.

According to another feature of the invention, the engine condition is detected by an engine temperature sensor.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

Figure 1:
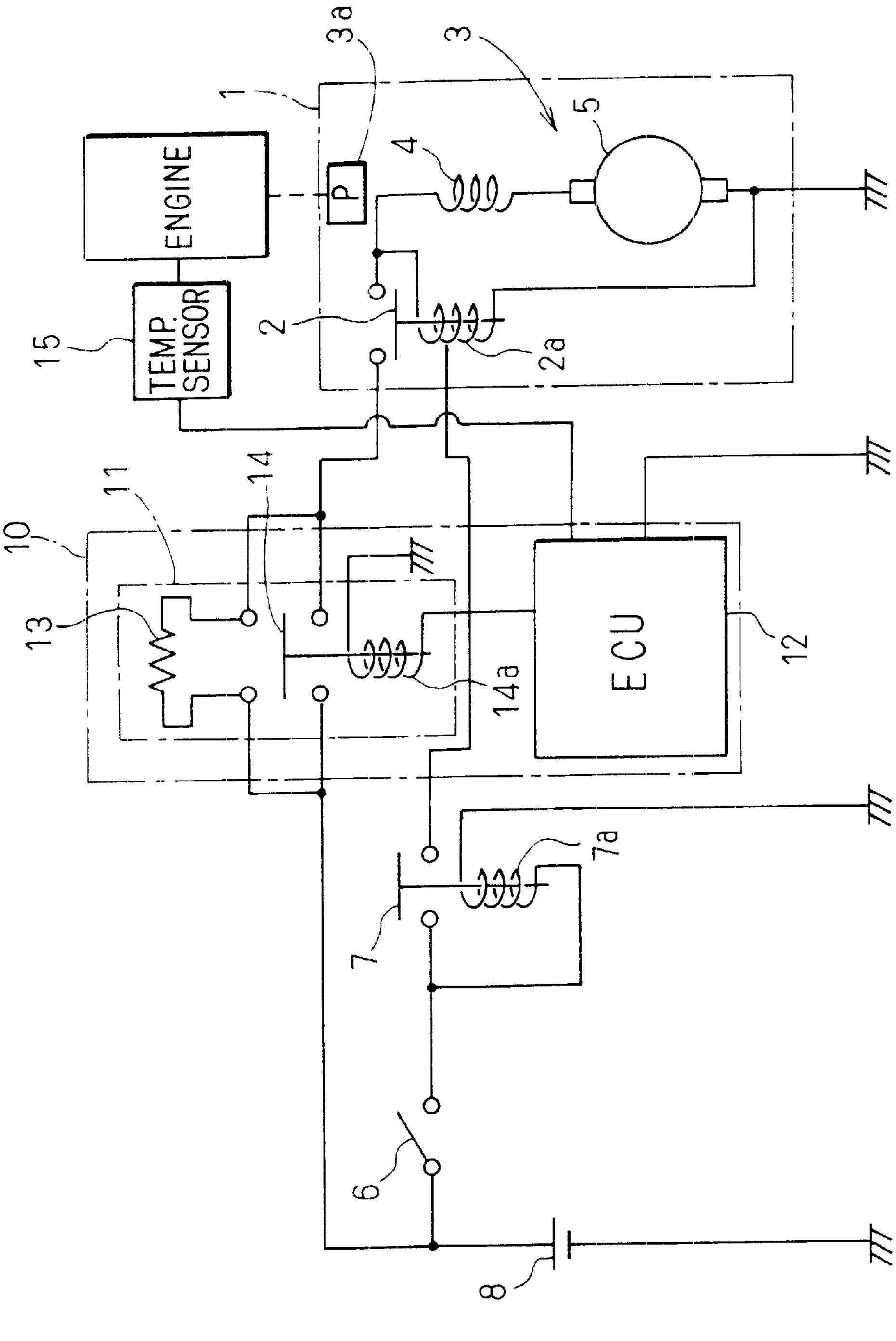
FIG. 1 is an electric circuit diagram of a starter control circuit according to a first embodiment of the invention.

A starter control circuit according to a first embodiment of the invention is described with reference to FIG. 1. A starter 1 is comprised of a magnet switch 2 and a starter motor 3. The starter motor 3 has a well-known ordinary structure that is comprised of a field coil 4 for generating magneto-motive force at a stator and an armature 5 that has an armature coil.

A coil 2*a* of the magnet switch 2 is comprised of a pull-in coil and a holding coil, which are connected to a vehicle battery 8 via a key switch 6 and starter relay 7. When the key switch 6 is turned on, a coil 7*a* of the starter relay 7 is energized to close a normally-open movable contact of the starter relay 7 to energize the coil 2*a* of the magnet switch 2. If the coil 2*a* is energized, the magnet switch 2, which is a normally-open switch, is turned on.

A current control circuit 10 controls preliminary rotation speed of the starter motor 3 for a preliminary rotating period according to a condition of the engine. The preliminary rotating speed is high enough to engage a pinion of the starter 1 with a ring gear of the engine in the predetermined preliminary period. The preliminary rotating speed is lower than a normal operation speed that can fully start up the engine. The current control circuit 10 is comprised of a current change circuit 11 and an ECU 12. The current change circuit 11 is comprised of a resistor 13 and a current switching relay 14, which is a normally-open switch. If the current switching relay 14 turns off and the magnet switch 2 turns on, the starter motor 3 is energized via the resistor 13 to rotate at a preliminary speed that is lower than a normal operation speed. On the other hand, if the current switching relay 15 turns on and the magnet switch 2 turns on, the resistor 13 is short-circuited so that the starter motor 3 is energized directly to rotate at the normal operation speed.

The coil 14*a* of the current switching relay 14 is controlled by the ECU 12. When the starter motor 3 is started, it rotates at the preliminary rotation speed first and at the normal operation speed thereafter.

Thus the ECU 12 controls the current switching relay 14 to change the preliminary rotation period according to an engine condition, such as engine temperature. For example, the engine temperature is represented by engine coolant temperature or temperature of the engine, which is detected by a temperature sensor 15.

The ECU 12 has a map for determining the preliminary rotation period according to the engine temperature. The preliminary rotation period is set longer if the engine temperature is lower. On the other hand, the preliminary rotation period is set shorter if the engine temperature is higher.

Figure 2:
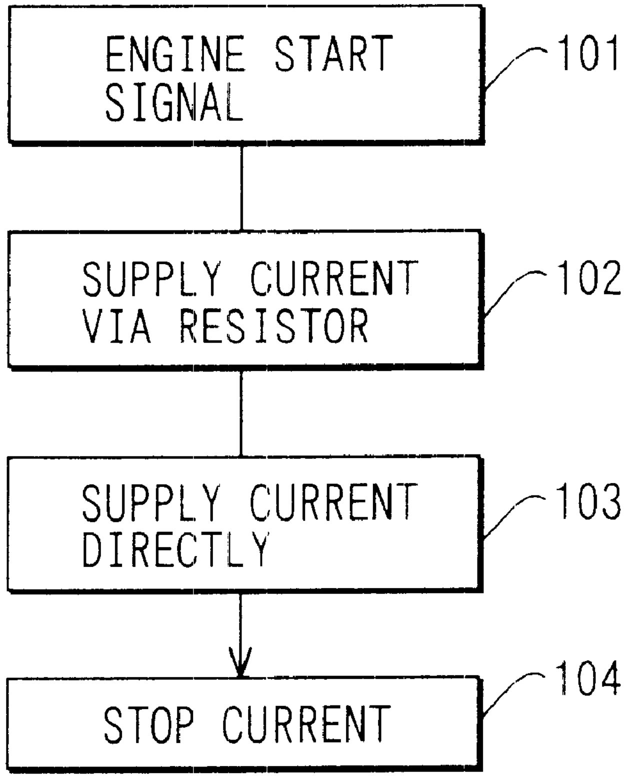
FIG. 2 is a flow diagram of a process of controlling supply of starter current.

The current control of the starter 1 is described with reference to a flow diagram shown in FIG. 2.

At step 101, if the key switch 6 is turned on (to start the starter 1), an engine start signal is inputted to the ECU 12. The ECU 12 determines the preliminary rotation period, in which the starter 3 is rotated at a preliminary speed suitable for the engine temperature.

At step 102, the starter motor 3 is energized via the resistor 13. Consequently, the starter motor 3 rotates at the preliminary rotation speed that is lower than the normal operation speed. Accordingly, a pinion 3*a* of the starter 1 engages a ring gear (not shown) of the engine gradually to rotate the engine.

When the preliminary rotation period has passed, the current switching relay 14, which is a normally-open switch, turns on, so that the resistor 13 is short-circuited and the starter motor 3 is energized directly. Therefore, the starter motor 3 rotates at the normal operation speed.

If the engine fully starts up and the key switch 6 is turned off, the starter motor 3 is de-energized at a step 104.

In summary, when the key switch 6 is turned on, the magnet switch 2 are turned on. At this moment, the current switching relay 14 is turned off for a predetermined preliminary period, and the starter motor 3 is energized by the battery via the resistor 13 to rotate at a suitable low speed or a preliminary rotation speed. When the preliminary rotation period has passed, the current switching relay 14 is turned on by the ECU 12. Consequently, the starter motor 3 is supplied with much more current by the battery 8 to rotate at the normal operation speed.

Thus, the engine rotation speed increases more quickly as soon as the engine is rotated by the starter. This shortens the starting period of the starter system during which the engine is rotated by the starter until the engine starts up full operation.

When the starter 1 starts rotation, the pinion 3*a* of the starter 1 engages the ring gear of the engine at the preliminary speed that is lower than the normal operation speed. Therefore, rattling noise of the gears is not very loud. Since the engine is preliminary rotated at the low preliminary speed before it is rotated at the normal operation speed, noise generated while the rotation speed of engine is changing can be suppressed.

Test results show that the engine can be started more quickly by a starter control system in which the engine is preliminary rotated at a suitable low speed before it is rotated at the normal speed than a conventional starter control system in which the engine is immediately rotated at the normal operation speed. The test results are data obtained when the engine is started at a cold temperature.

Figure 3A:
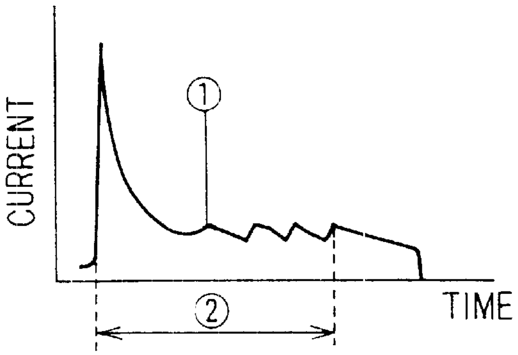
FIGS. 3A, 3B and 3C are graphs showing starter current change while the engine is being started.
Figure 3B:
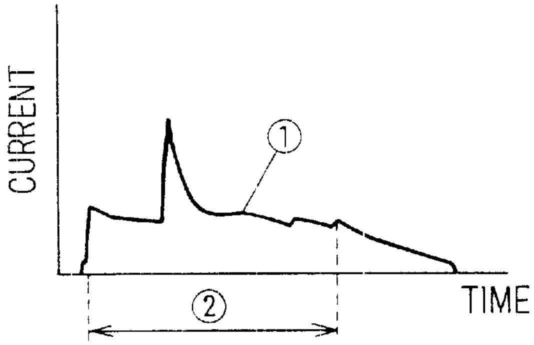
Figure 3C:
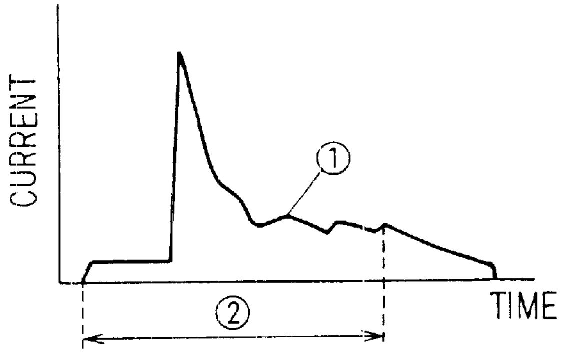

FIG. 3A is a graph showing current flowing through the starter motor 3 rotated by a conventional starter control system. FIG. 3B is a graph showing current flowing through the starter motor 3 rotated by the starter control system according to the first embodiment of the invention, in which resistance of the resistor 13 is a suitable value, such as 25–50 mΩ. FIG. 3C is a graph showing current flowing through the starter motor 3 in case resistance of the resistor 13 is a large value, such as 100-∞mΩ.

In the meantime, ① indicates the number of peaks of the starter current while the starter is cranking the engine, and ② indicates a period during which the engine is fully started.

TABLE 1

| LOW ROTATION PERIOD | RESISTANCE | ① NO. OF PEAKS | ② STARTING TIME (msec) |
|---|---|---|---|
| 50 msec | 25 mΩ | 3.5 | 685 |
| 50 msec | 33 mΩ | 3 | 551 |
| 50 msec | 50 mΩ | 3 | 565 |
| 50 msec | 100 mΩ | 4 | 825 |
| 50 msec | ∞ Ω | 4 | 895 |
| 100 msec | 25 mΩ | 3.5 | 818 |
| 100 msec | 33 mΩ | 3.5 | 724 |
| 100 msec | 50 mΩ | 3 | 620 |
| 100 msec | ∞ Ω | 4 | 910 |
| 200 msec | 25 mΩ | 3.5 | 886 |
| 200 msec | 33 mΩ | 3 | 746 |
| 200 msec | 50 mΩ | 3 | 767 |
| 200 msec | 100 mΩ | 4 | 858 |
| 200 msec | ∞ Ω | 4 | 978 |
| 0 msec no current is supplied | ∞ Ω | 4 | 783 |

Table 1 shows relationship among preliminary rotation period, various resistances of the resistor 13, the number of peaks ① of waves of the current supplied for cranking and engine starting time ②.

If the preliminary rotation is omitted (a conventional starter system) as shown in the bottom of the Table 1, the number of peaks ① is four (4) and the starting time ② is 783 msec.

On the other hand, if the low rotation period is 50 msec and the resistance of the resistor 13 is a value between 25 and 50 msec, the number of peaks ① is less than 4, and the starting time ② is less than 783 msec. If the resistance of the resistor 13 is 33 mΩ or 50 mΩ, the number of peaks ① is 3 and the starting time ② is 551 msec or 565 msec, which are shorter than the starting time of the conventional starter system.

If the preliminary rotation period is 100 msec and the resistance of the resistor 13 is 33 mΩ or 50 mΩ, the number of peaks ① is less than 4, and the starting time ② shorter than 783 msec. If the resistance of the resistor 13 is 50 mΩ, the number of peaks ① is less than 3, and the starting time is 620 msec, which is much shorter than the conventional starter system.

If the preliminary rotation period is 200 msec and the resistance of the resistor 13 is 33 mΩ or 50 mΩ, the number of peaks ① is less than 4, and the starting time ② is shorter than 783 msec.

In summary, it is preferable that the preliminary rotation period is 50 msec and the resistance of the resistor 13 is 33 or 50 mΩ, or that the preliminary rotation period is set 100 msec and the resistance of the resistor 13 is 50 mΩ, so that the engine starting time can be reduced much shorter than the starting time of the conventional starter system. The above data are only an example, and the optimum preliminary rotation period and the resistance of the resistor 13 may vary with type or size of the engine and the starter to be mounted on a vehicle.

When the starter 1 is started, the pinion 3*a* of the starter 1 engages the ring gear (not shown) of the engine at the preliminary rotation speed. Therefore, the rattling gear noise becomes small. Moreover, since the engine having a large inertia is preliminary rotated at a the preliminary rotation speed before it is rotated at a normal rotation speed, the noise caused by tottering cranking of the engine can be reduced. Thus, as compared with the conventional starter system, the rattling noise and the noise due to the cranking operation of the engine become lower. In other words, the engine starting noise can be reduced.

A starter control system according to a second embodiment is described hereafter. Instead of a mechanical switch having a normally-open movable contact of the starter control system according to the first embodiment, MOSFET or another electronic switching element (not shown) is used as the current switching relay 14.

A starter control system according to a third embodiment is described hereafter.

In the above first embodiment, the preliminary rotation period is changed according to the engine condition. In the starter control system according to the third embodiment, the rotation speed of the starter motor 3 at the preliminary stage of the rotation is changed according to the engine condition.

The combination of the first embodiment and the second embodiment is also possible. That is, both the preliminary rotation speed and the rotation speed of the starter can be changed according to the engine condition.

A map that determines the preliminary rotation speed according to the engine temperature is installed in the ECU 12. Therefore, the preliminary rotation speed of the starter 1 when the temperature of the engine is lower is set to be lower than the preliminary rotation speed when the engine temperature is higher.

It is possible to use a mechanical resistance changing element or an electronic conduction changing element (IGBT) to change the rotation speed of the starter motor 3.

As a variation, the engine condition can be detected by a timer that counts time after the engine is stopped.

Instead of the key switch 6, a switch controlled by the ECU 12 can be used to control the operation of the starter 1.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A starter control system for starting an engine, comprising:

a starter having a starter motor and an engine engagement member connected between said starter motor and the engine for driving the engine only when said engine is started;

first means for storing data; and second means for rotating said starter motor at a preliminary rotation speed that is lower than a normal operation speed for a preliminary period before rotating said starter motor at said normal operation speed, wherein said preliminary period is determined according to said data.

2. The starter control system as claimed in claim 1, wherein said data includes data of periods corresponding to various engine conditions; and said second means changes said preliminary period according to an engine condition.

3. The starter control system as claimed in claim 2, wherein said data includes data of rotation speed corresponding to various engine conditions; and said second means changes said preliminary rotation speed according to said engine condition.

4. The starter control system as claimed in claim 3, wherein said second means comprises a circuit for changing current supplied to said starter motor.

5. The starter control system as claimed in claim 1, wherein said data includes data of periods corresponding to various engine temperatures; and said second means changes said preliminary period according to temperature of said engine.

6. A starter control system for starting an engine, comprising:

a starter having a starter motor and an engine engagement mechanism connected between said starter motor and the engine for driving the engine only when the engine is started;

first means for storing data of periods in which said engine is rotated at various engine conditions; and second means for controlling said starter motor to rotate said engine at a preliminary rotation speed that is low enough to suppress a harsh noise when said engagement mechanism engages said engine for a preliminary period and rotate at a normal operation speed until said engine is started, said preliminary rotation speed being selected from said data according to an engine temperature.

7. The starter control system as claimed in claim 6, wherein said second means comprises a circuit for controlling current supplied to said starter motor to rotate at said preliminary rotation speed for said preliminary period and at said normal operation speed thereafter.

8. The starter control system as claimed in claim 6, wherein said second means comprises an engine temperature sensor.

9. A starter control system for starting an engine, comprising:

a starter having a magnet switch, a starter motor and a pinion;

a control circuit for controlling said starter motor to rotate at a preliminary rotation speed that is high enough to engage said pinion with said engine for a predetermined time and low enough to suppress a harsh noise caused when said pinion engages said engine and at a normal rotation speed that is high enough to start said engine until said engine is started; and means, including a map storing data of period that correspond to engine condition, for changing said preliminary rotation speed according to an engine condition.

10. The starter control system as claimed in claim 9, wherein said control circuit comprises a current switching relay, a resistor connected in parallel with said current switching relay and an ECU for controlling said current switching relay.

11. The starter control system as claimed in claim 10, wherein said means comprises said ECU and an engine temperature sensor.

12. A starter control system for starting an engine, comprising:

a starter motor being operable only when said starter motor starts said engine;

a map storing data of periods that correspond to engine conditions; and means for rotating said starter motor at a preliminary rotation speed that is lower than a normal operation speed for a preliminary period before rotating said starter motor at said normal operation speed, wherein said preliminary period is selected from said data according to an engine condition.

13. A starter control system for starting an engine, comprising:

a starter motor;

a map storing data of periods that correspond to engine conditions;

first means for operating said starter motor only when said starter motor starts said engine; and second means for controlling said starter motor to rotate at a preliminary rotation speed for a preliminary period that is selected from said data according to an engine condition and thereafter rotate said starter motor at a normal operation speed that is higher than said preliminary rotation speed.

* * * * *